United States Patent Office 3,381,454
Patented May 7, 1968

3,381,454
FILTER FOR ABSORPTION AND ADSORPTION OF GASES, VAPORS, ODORS AND THE LIKE
Kurt Sponsel, Dusseldorf-Nord, Germany, assignor to Collo-Rheincollodium, Köln G.m.b.H. Werk Hersel, Hersel, near Bonn, Germany
No Drawing. Filed Oct. 1, 1963, Ser. No. 312,893
Claims priority, application Germany, Oct. 11, 1962,
S 81,999
9 Claims. (Cl. 55—528)

The present invention relates to a filter for the absorption and adsorption of gases, vapors, smokes, odors and like atmospheric contaminants harmful to health. In particular in accordance with this invention the incompletely burned exhaust gas mixtures from automobile engines, gas turbines, and diesel engines are rendered harmless, and as well as the deodorization of refrigerators, toilets and spaces which are smoky or steamed up is attained.

There are known for this purpose gas mask filter inserts or entire cannisters which permit only a single use. Here there are used highly porous carbon filters and coated filter stones, which require a frequent regeneration in inconvenient fashion.

It has now been found that, because of their high water holding and carrying ability, organic hydrophilic, open cellular foam substances are particularly suited as substrates or carriers for catalytically effective redox-groups, that is, oxidation-reduction systems. If, for example, a mixture of copper oxide-manganic hydroxide-iron oxide is used as a catalyst in the presence of potash, this combination represents an effective redox system, which with the help of atmospheric oxygen and at usual temperatures converts the poisonous into unpoisonous and generally non-odorous substances.

As carrier substances, in accordance with the invention, for example linear or netted polyurethane foams find application, to which are added the catalysts or other reaction promoters. In accordance with the invention, as oxidation reduction systems, there finds the application easily oxidizable and reducible compounds such as copper oxides, manganese oxides in the presence of potassium carbonate, silver oxides, cobalt oxides, iron oxides and similarly acting organic compounds.

Aluminum hydrosilicate serves advantageously for formation of the open cellular uniform synthetic foams.

For the preparation of polyurethane foam material it is advantageous in accordance with the invention to add an emulsifying agent to the mixture, as for example, an aliphatic polyglycol ether.

EXAMPLE 1

125 parts by weight of a polyol polymer product of ethylenediamine with propylene oxide and ethylene oxide (for example Tetronic 304 of Wyandotte Chemical Corp., having an average molecular weight of about 1300 with from 40% to 49% by weight of hydrophilic oxyethylene units in the molecule, and an average molecular weight of about 501 to 1000 for the condensation product of propylene oxide with ethylene-diamine provding a hydrophobic base in the molecule), and 125 parts by weight of a propylene oxide-ethylene oxide-mixed product linear block polymer polyol, (for example Pluronic L 44 of Wyandotte, a liquid polyol having an average molecular weight of about 2000 with approximately 40% by weight of hydrophilic polyoxyethylene in the total molecule and a typical molecular weight of about 1200 for the hydrophobic polyoxypropylene base in the molecule) are admixed with 25 parts by weight of 10% sulfuric acid neutralized with 50 parts by weight of montmorillonite powder (bentonite),
15 parts by weight of dehydro aluminum silicate of a molecular sieve 13×,
3 parts by weight of water,
2 parts by weight of tin dioctoate,
9.6 parts by weight of potassium permanganate,
6.9 parts by weight of basic copper carbonate, and stirred to a uniform mixture and adjusted to 20° C. To this mixture there is added in an intensive mixer, 60 parts by weight of toluylene diisocyanate, and the mixture stirred to a creamy condition and poured into a coolable vessel. Here the manganese and copper contents of the total reaction mixture amount to approximately 0.8% and 0.9% respectively, or roughly equal amounts. With this there is quickly formed a light elastic foam, which hardens up in an hour's time in a drying chamber at about 50° C.

The finished elastic foam block while still warm is cut into plates and placed in water. After one hour's alkaline water treatment, the plates are squeezed out between rubber rolls and are now ready for installation.

In use, care should be had that the sponge-like plate always feel moist. It can be washed with soap and water, and repeatedly regenerated by itself.

EXAMPLE 2

1000 parts of a polyvinyl chloride-acetate-mixed polymerisate (85/15) with 460 parts of dioctyl phthalate,
200 parts of long-chain alkyl polypropylene oxide-phenyl ether,
50 parts of manganese dioxide,
30 parts of cuprous oxide,
15 parts of cobaltic oxide,
5 parts of silver oxide, and
200 parts of aluminum silicate (Zeolith or molecular sieve 13× of the Linde Co., division of Union Carbide Corporation) or active bentonite, is ground to a paste, and is saturated in a pressure vessel with carbon dioxide and nitrogen at 50 atmospheres pressure.

Before the injection or completion of the foaming, to 100 parts by weight of the mixture there is added about 5 parts by weight of a $C_{12}$-$C_{18}$ acid, in which the carboxyl group is attached to a tertiary carbon atom, and then the mass is coagulated by heat with expansion. In the mixture subjected to the carbon dioxide and nitrogen saturation, the manganese, copper, cobalt and silver contents by weight amount to approximately 1.53%, 1.31%, 0.51% and 0.22% respectively or 3.57% total.

The expanded foam piece is saponified at 80–90° C. in a pan of sodium hydroxide, washed, squeezed out and dried.

There arises a hydrophilic foam, that up to 60° C. temperature readily oxidizes carbon monoxide to carbon dioxide and can be used as an exhaust gas filter in exhaust mufflers or the like.

I claim:
1. A regeneratable, catalytically active filter for absorption and adsorption and oxidation of air-borne gaseous substances such as exhaust fumes, vapors and odors, said filter active without need of elevation above normal atmospheric temperatures, and comprising an open-celled, hydrophilic polyurethane foam material and containing a catalytically active oxidation-reduction system incorporated as the foam is formed and comprised of compounds selected from the group consisting of copper oxides, manganese oxides in the presence of potassium carbonate, silver oxides and iron oxides, said filter being regeneratable by soap and water washing.

2. A regeneratable, catalytically active filter for absorption and adsorption and oxidation of air-borne gaseous substances such as exhaust fumes, vapors and odors, said filter active without need of elevation above normal atmospheric temperatures, and comprising a body of open-celled, hydrophilic polyurethane foam material and containing a catalytically active oxidation-reduction system incorporated as the foam is formed and comprised of a plurality of compounds selected from the group consisting of copper oxides, manganese oxides, cobalt oxides, silver oxides and iron oxides, said filter being regeneratable by soap and water washing.

3. A method of preparing a catalytically active filter for absorption and adsorption and oxidation of air-borne gaseous substances such as refrigerator and room odors, said filter active without need of elevation above normal atmospheric temperatures and regeneratable by soap and water washing comprising the steps of: mixing to a uniform condition 125 parts by weight of a hydrophilic polyol polymer product of ethylenediamine with propylene oxide and ethylene oxide said product having an average molecular weight of 1300 and obtained by sequential addition of propylene oxide with the ethylenediamine to produce a hydrophobic base with an average molecular weight of about 501 to 1000 then of ethylene oxide to the base until comprising 40% to 49% of the product molecule, and 125 parts of a propylene oxide-ethylene oxide-mixed product liquid polyol of a linear block polymer type having an average molecular weight of about 2000, approximately 40% by weight of hydrophilic polyoxyethylene and a hydrophobic polyoxypropylene base in the molecule of about 1200 in molecular weight, 25 parts of 10% sulphuric acid neutralized with 50 parts of Montmorillonite powder, 15 parts of aluminum silicate molecular sieve of the 13× type, 3 parts of water, 2 parts of tin dioctoate, 9.6 parts of potassium permanganate, 6.9 parts of basic copper carbonate; admixing therein 60 parts of toluylene diisocyanate to produce an elastic foam body; soaking the foam body with an aqueous alkaline solution, and expressing the solution from the body.

4. A filter produced by the method described in claim 3.

5. A method of preparing a catalytically active filter for absorption and adsorption and oxidation of air-borne gaseous substances, said filter active without need of elevation above normal atmospheric temperatures and regeneratable by soap and water washing comprising the steps of: mixing by grinding to a paste 1000 parts by weight of a 85/15 polyvinyl chloride-acetate-mixed polymerizate with 460 parts of dioctyl phthalate, 200 parts of long-chain alkyl polypropylene oxide-phenyl ether, 50 parts of manganese dioxide, 30 parts of cuprous oxide, 15 parts of cobaltic oxide, 5 parts of silver oxide, and 200 parts of active bentonite; saturating the paste with carbon dioxide and nitrogen at a pressure of 50 atmospheres and thereafter coagulating the material to form an elastic foam body with expansion by heating; and saponifying the expanded foam body with sodium hydroxide solution followed by washing out with water.

6. A filter produced by the method described in claim 5.

7. A method of production of a regeneratable filter for removal of malodorous and noxious gaseous components from a gas phase, by adsorption, absorption and catalytic oxidation by oxygen contained in said gas phase, said filter being operable at temperatures normally encountered in refrigerators, inhabited building spaces and internal combustion engine exhaust gases and regeneratable by soap and water washing, said method comprising:

mixing compounds adapted to interact to form an open-cellular, hydrophilic polyurethane foamed structure and, simultaneously, with said compounds mixing in both a 13× molecular sieve type dehydro aluminosilicate and metal compounds adapted to form a redox system catalytically active for oxidizing said components with said oxygen;

allowing the resulting mixture to develop the foamed open-cellular structure by substantial completion of the foam producing reaction to a foamed structure sufficiently rigid for handling; and subjecting the rigidified foamed structure to action of an aqueous alkaline solution.

8. The method as described in claim 7, wherein said system is comprised of easily oxidizable and reducible compounds selected from the group consisting of oxides of the metals manganese, silver, iron, and cobalt.

9. The method as described in claim 8, wherein metal compounds to provide said oxides are incorporated into the reaction mixture in amounts representing between 0.22% to 1.53% of a respective metal, up to about 3.57% total of the metals.

References Cited

UNITED STATES PATENTS

| 2,025,140 | 12/1935 | Wenzel | 23—2.2 |
|---|---|---|---|
| 2,071,119 | 2/1937 | Harger | 23—2.2 |
| 2,770,241 | 11/1952 | Winkler | 55—522 XR |
| 2,920,717 | 1/1960 | Tuttle et al. | 55—510 XR |
| 2,966,960 | 1/1961 | Rochlin | 55—502 |
| 3,114,695 | 12/1963 | Rabo et al. | 252—455 |
| 2,970,886 | 2/1961 | Keeve | 252—184 XR |

FOREIGN PATENTS

| 667,680 | 3/1952 | Great Britain. |
|---|---|---|
| 931,853 | 7/1963 | Great Britain. |

LEON D. ROSDOL, *Primary Examiner.*

ALBERT T. MYERS, JULIUS GREENWALD, SAMUEL H. BLECH, *Examiners.*

M. WEINBLATT, *Assistant Examiner.*